United States Patent [19]

Pingry et al.

[11] Patent Number: 5,072,676
[45] Date of Patent: Dec. 17, 1991

[54] HOPPERS FOR PLANTERS

[75] Inventors: Larry J. Pingry, Celina; LaVern Kunk, Coldwater, both of Ohio

[73] Assignee: Allied Products Corporation, Chicago, Ill.

[21] Appl. No.: 614,911

[22] Filed: Nov. 16, 1990

[51] Int. Cl.$^5$ .............................................. A01C 7/20
[52] U.S. Cl. ................................... 111/63; 111/200; 220/306; 220/346
[58] Field of Search ............... 111/63, 64, 65, 925, 111/200; 220/306, 322, 345, 346, 350, 351, 347, 348; 171/144; 217/62; 27/15

[56] References Cited

U.S. PATENT DOCUMENTS

| | | | |
|---|---|---|---|
| 489,037 | 1/1893 | Roadhouse | 111/63 |
| 926,537 | 6/1909 | Bagley | 220/346 |
| 1,962,860 | 6/1934 | Duell et al. | 206/42 |
| 1,979,706 | 11/1934 | Reamy | 220/24 |
| 1,995,657 | 3/1935 | Taporouski | 47/41 |
| 2,064,241 | 12/1936 | Batdorf | 220/351 |
| 2,093,508 | 9/1937 | Batdorf | 220/41 |
| 2,102,094 | 12/1937 | Romig | 220/41 |
| 2,463,586 | 3/1949 | Anderson | 220/351 |
| 2,881,942 | 4/1959 | Allbright et al. | 220/347 |
| 3,961,443 | 6/1976 | Insalaco | 47/32 |
| 4,057,166 | 11/1977 | Yamazaki et al. | 220/8 |
| 4,342,403 | 8/1982 | Badtke et al. | 220/345 |
| 4,502,610 | 3/1985 | Todd | 220/351 X |

FOREIGN PATENT DOCUMENTS 1502258 3/1978 United Kingdom ............... 220/346

OTHER PUBLICATIONS

"New Idea 4, 6, 8 Row Planters" brochure showing insecticide hoppers and seed hoppers.

Primary Examiner—Dennis L. Taylor
Assistant Examiner—Jeffrey L. Thompson
Attorney, Agent, or Firm—Lockwood, Alex, FitzGibbon & Cummings

[57] ABSTRACT

A multi-row seed planter has a seed hopper for each row and may also have a herbicide and/or insecticide hopper for each row. The hoppers have generally rectangular top openings the rims of which are tubular in cross-section and referred to as "perimeter tubes". The closure lids for the hoppers slide on and off from the hopper openings. When each lid reaches its fully closed position it snaps into place and cooperating formations on the lid and perimeter tube retain it in its fully closed position against agitation and vibration during planter travel.

24 Claims, 6 Drawing Sheets

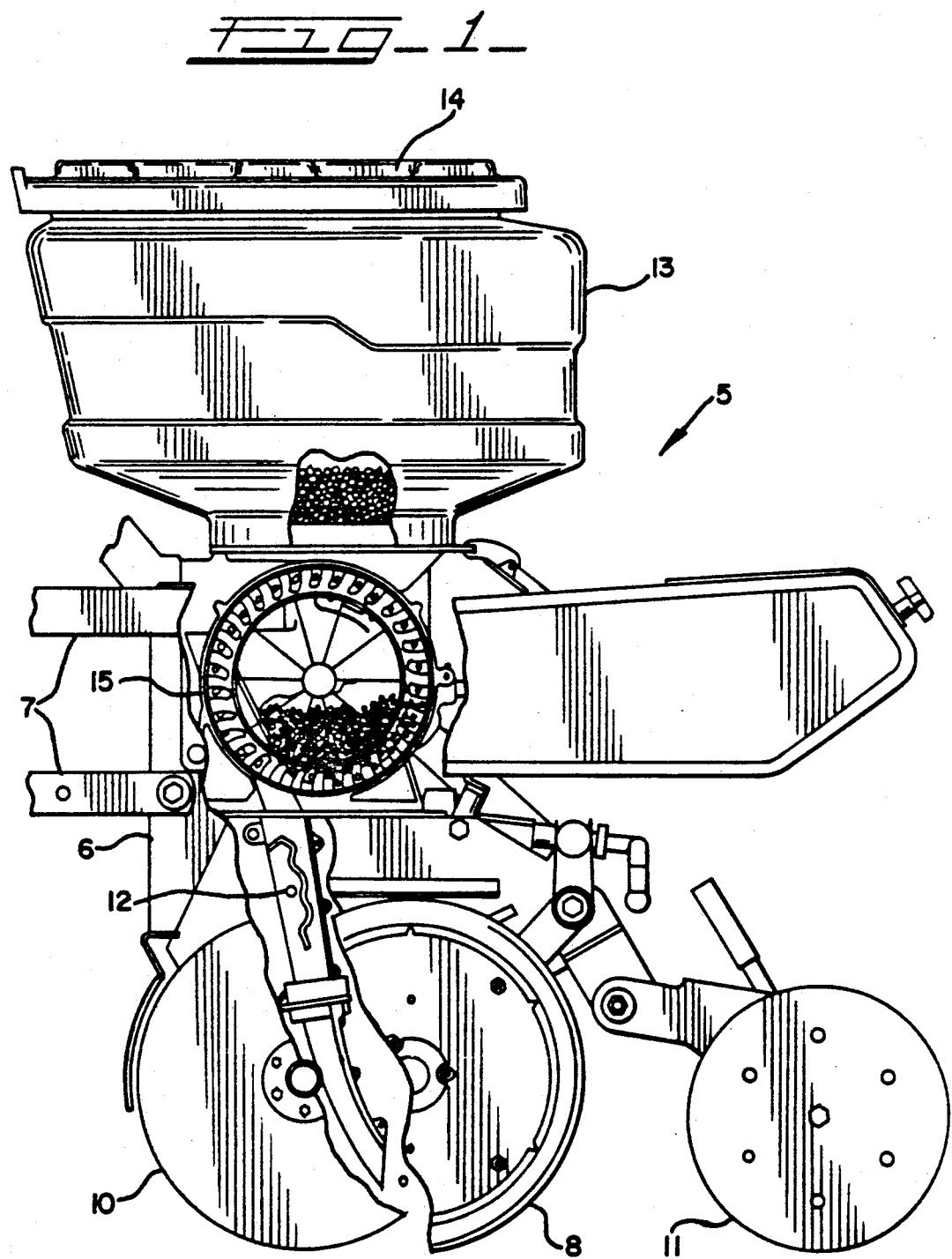

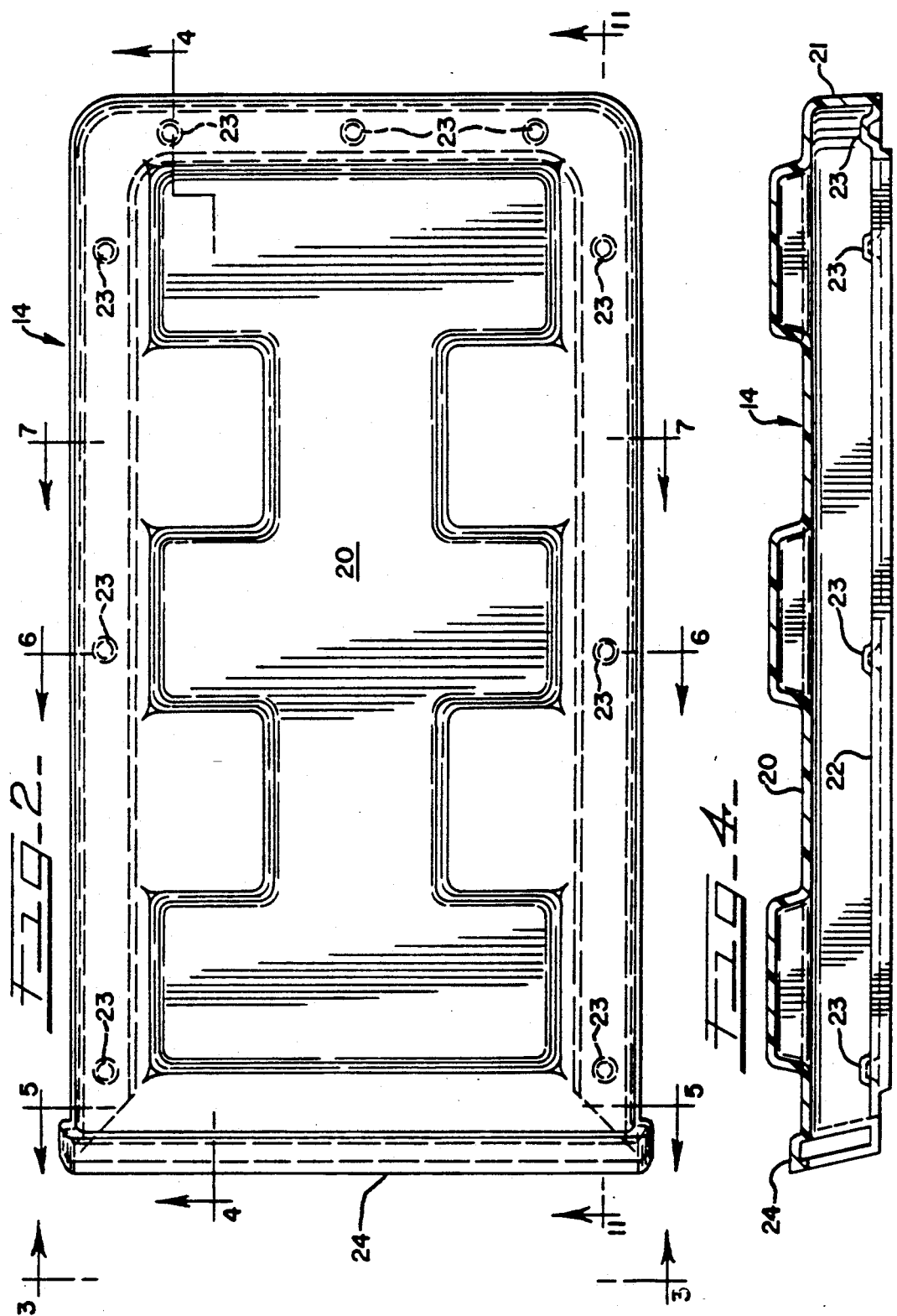

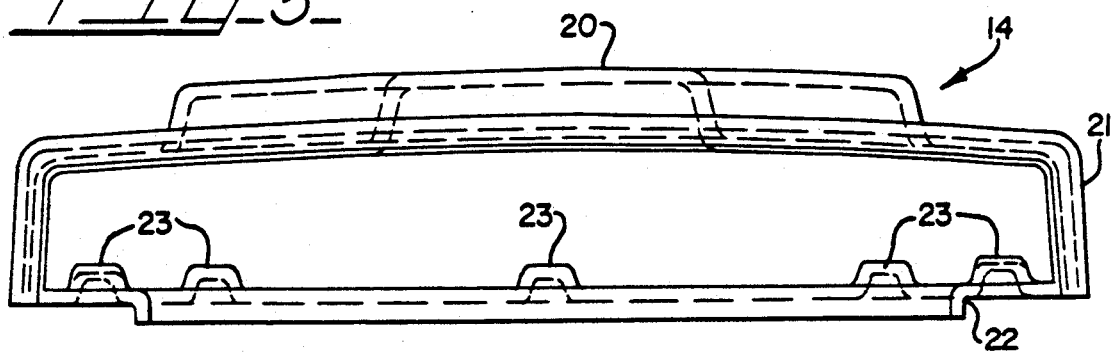
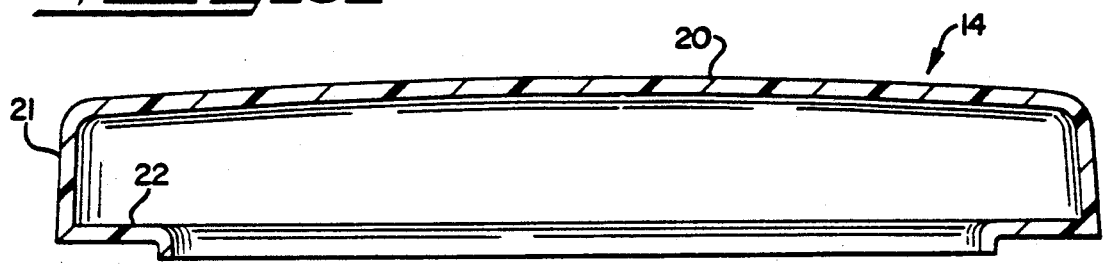
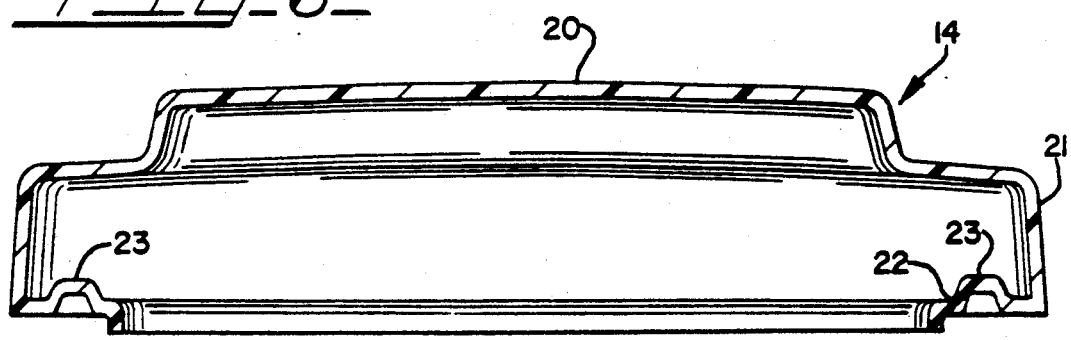
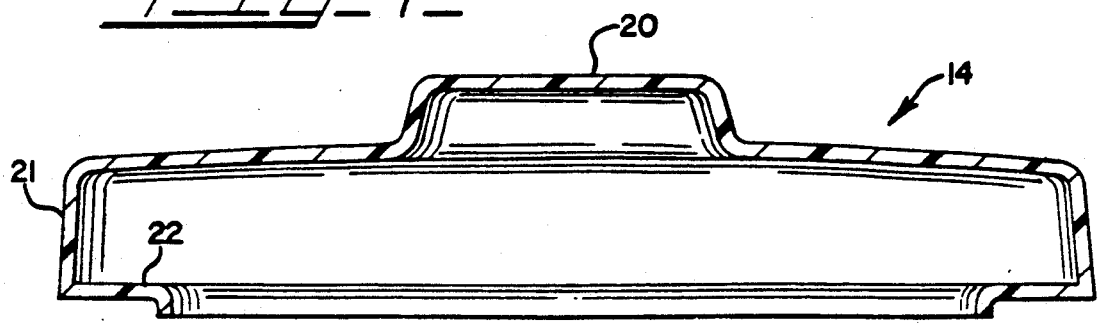

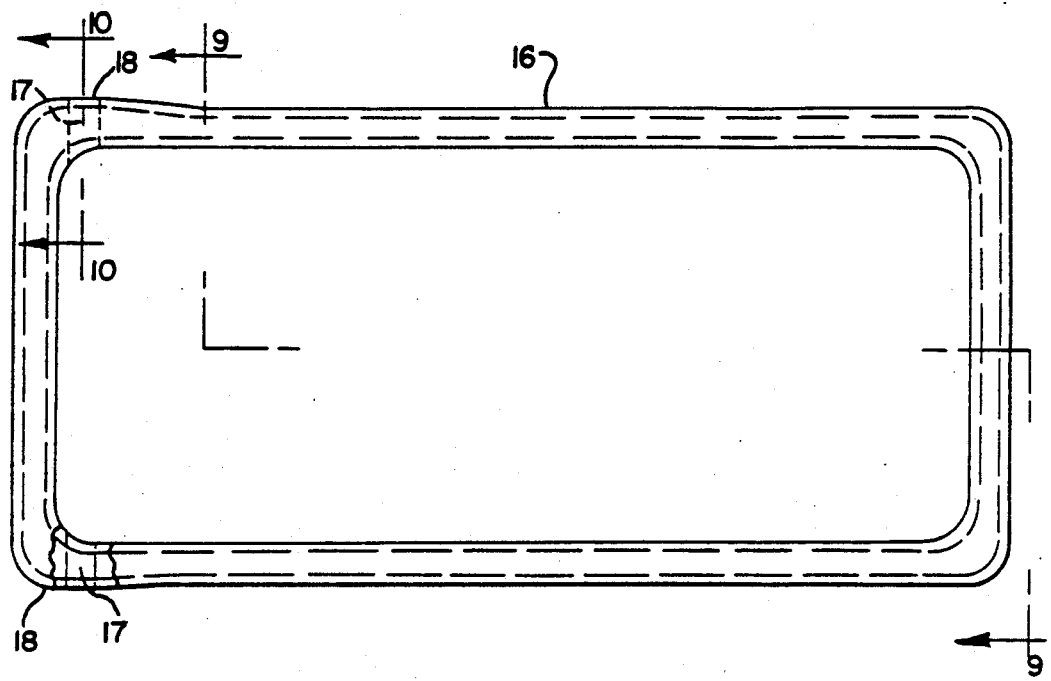
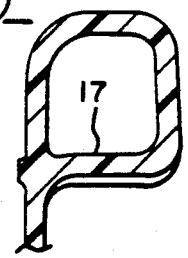
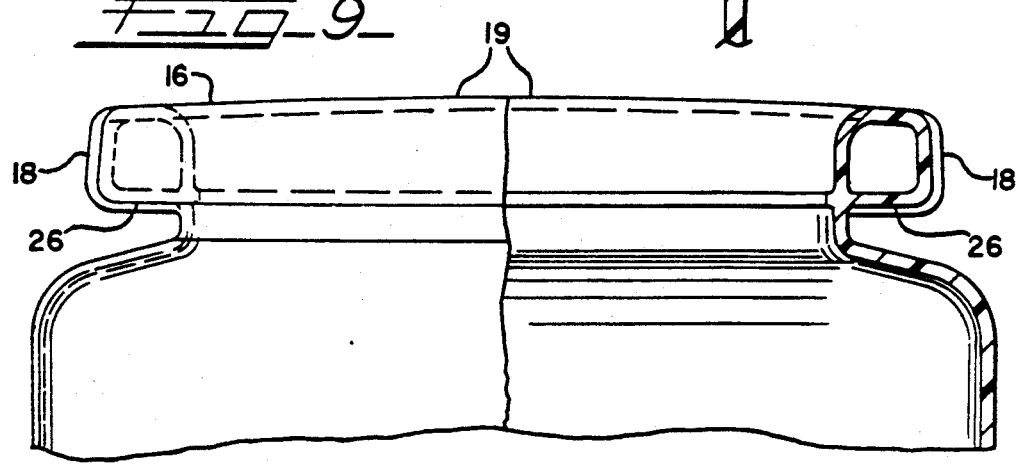

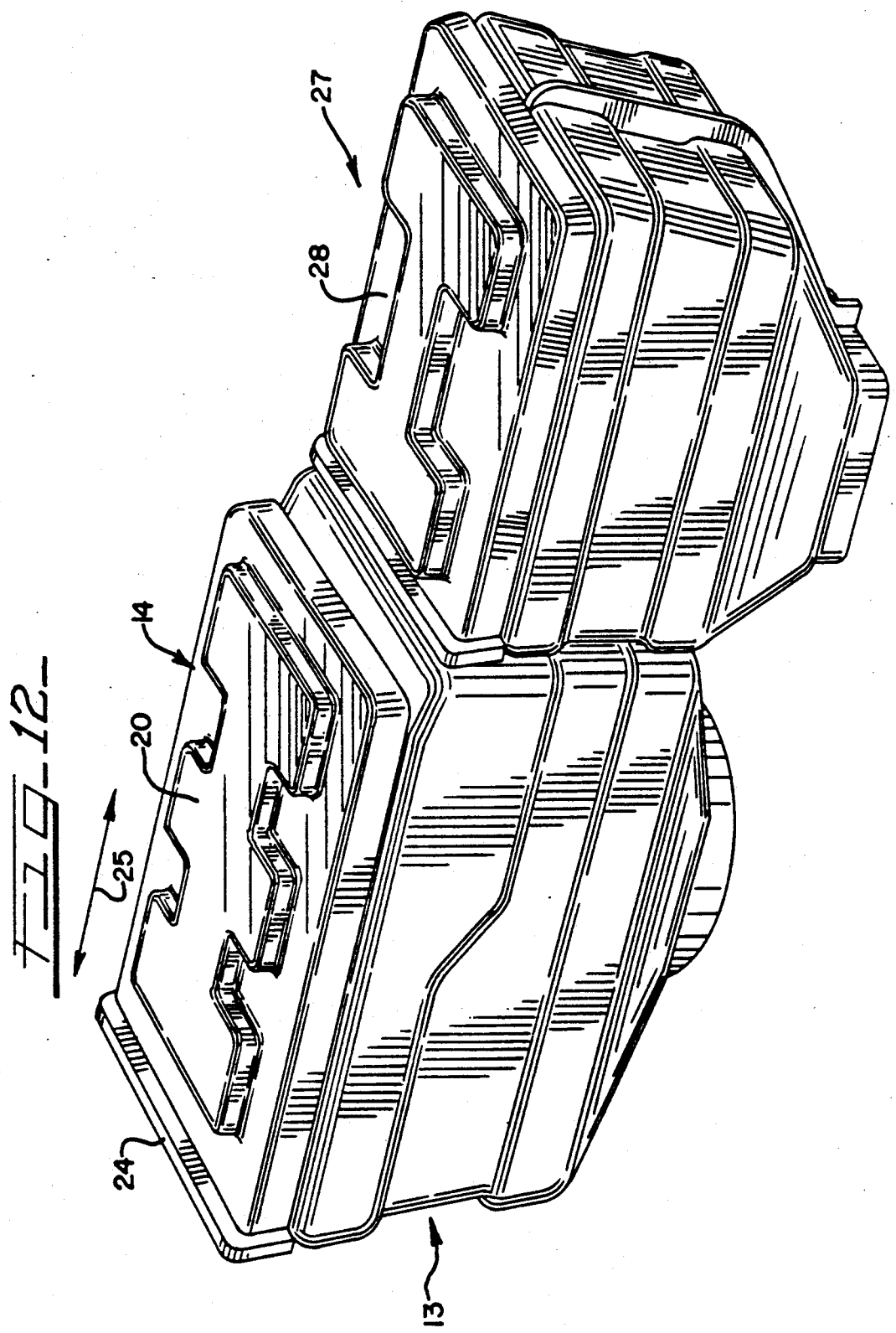

HOPPERS FOR PLANTERS

BACKGROUND AND DESCRIPTION OF THE INVENTION

This invention relates generally to innovations and improvements in hoppers particularly for multi-row planters and the cooperating structures of the hopper openings and hopper lids. In addition to the hoppers for seed corn, soy beans and other seeds, multi-row planters may also have hoppers for dry free-flowing herbicides and/or insecticides.

It is important that the hoppers for the planters be provided with closures to protect the hopper contents both when the planters are in use and when they are idle. During planting, the hoppers require frequent filling in the field making it important that the closure lids therefore are readily removed and replaced. Since the planters, including their hoppers are subject to varying amounts of agitation and vibration during travel both during the planting operation and in travel from place to place, it is essential that the operators are made aware when the closures have been fully replaced in the fully closed position and that they will remain in the fully closed position and resist dislodgement until intentionally removed by the operator. Further, since wide multi-row planters have wings which can be folded up so as to reduce the width of a planter and allow it to travel on a highway and pass through gates and narrow spaces it is also essential that contents of the hoppers on the folded up wings not leak or spill out of these raised and tilted hoppers.

It has been found in accordance with the present invention, that closure lids which slide on and off of the hoppers on planters can very satisfactorily fill the above-mentioned requirements provided that the lids and the hopper openings have certain cooperating structural features. These structural features include (1) detents on the lids to provide tight fits and other detents which inter-lock with indents on the hopper openings, (2) hopper openings or rims which are tubular in cross section, and (3) guidance formations on the hopper openings which guide and cause the closure lids to snap into place in the closed position.

The object of the invention, generally stated is the provision of hoppers and closure lids combinations, particularly for multi-row seed planters which permit the closure lids to be readily removed and replaced with a sliding action and which when fully in place the lids fit tightly and resist dislodgement due to agitation and vibration encountered by the planters.

Certain other objects of the invention will become apparent to those skilled in the art in view of the following detailed description of a preferred embodiment of the invention taken in connection with the accompanying drawings wherein:

BRIEF DESCRIPTION OF THE DRAWINGS

FIG. 1 is a side elevational view of one row of a multi-row planter of the type mounted on the tool bar of a tractor;

FIG. 2 is a top plan view of the closure lid on the seed hopper of the planter shown in FIG. 1;

FIG. 3 is an elevational view taken on line 3—3 of FIG. 2;

FIGS. 4-7 are cross sectional views taken on lines 4—4, 5—5, 6—6 and 7—7, respectively, of FIG. 2;

FIG. 8 is a top plan view, partly broken away, of the perimeter tube defining the top opening of the hopper of the planter of FIG. 1;

FIG. 9 is a view partly in elevation and partly in section taken on line 9—9 of FIG. 8;

FIG. 10 is an enlarged fragmentary sectional view taken on line 10—10 of FIG. 10;

FIG. 12 is a perspective view showing the seed hopper of FIG. 1 in combination with a herbicide/insecticide hopper, both with closure lids of the present invention.

DESCRIPTION OF PARTICULAR EMBODIMENT

Figure 11:
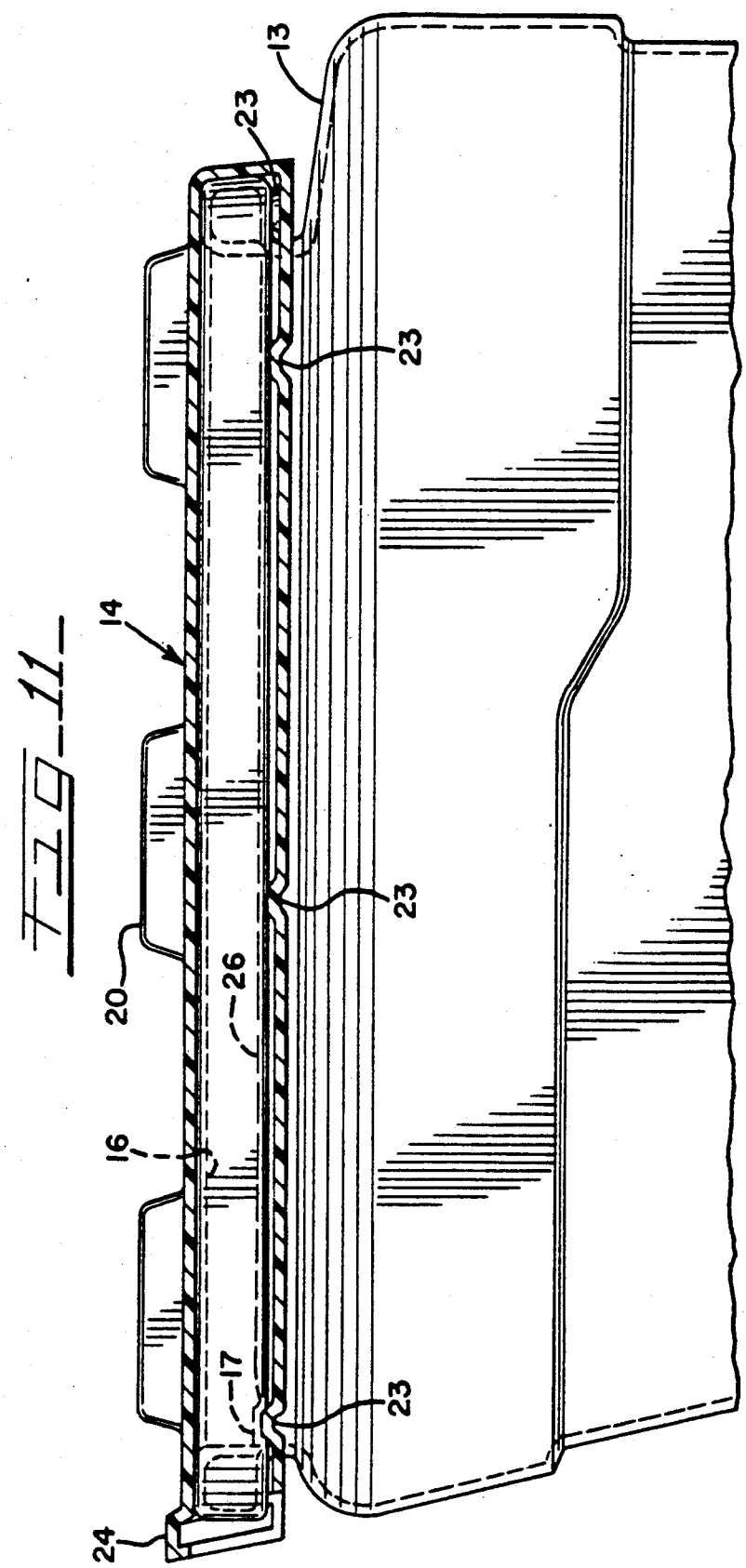
FIG. 11 is a view showing the fit between the lid of FIGS. 1-7 and the perimeter tube of FIGS. 8-10, the lid being shown in vertical longitudinal section taken on line 11—11 of FIG. 2 and the perimeter tube being shown in elevation along with the upper portion of the hopper of FIG. 1.

Referring to FIG. 1, the planter for one row of a multi-row planter of known type is indicated generally at 5 comprising a frame 6 which is supported from the front by a parallel linkage of known type 7 to be connected in known manner to the tool bar of a tractor. The tool bar may, for example, have a center section with wings on opposite ends which fold up and on which planter units 5 are mounted. The frame 6 has mounted thereon a pair of depth gauge wheels 8 which support the planter during planting, a pair of furrow opening discs 10, furrow closing wheels 11, a seed tube 12, a seed hopper 13 with a closure lid 14 and seed metering unit 15.

In operation, as is well understood, seeds flow by gravity from the hopper 13 into the metering unit 15 from which they are dispensed into the top of the seed tube 12 from the bottom end of which they fall into the furrow which has been opened by the furrow-opening discs 10. The depth gauge wheels 8 support the planter 5 and determine the depth of the furrow and the furrow closing wheels 11 close the furrow into which the seed has fallen.

The present invention relates particularly to the closure lid 14 and the construction of the perimeter tube or rim which defines the top opening of the seed hopper 13.

Referring to FIGS. 8-10, the opening into the hopper 13 is defined by the rim or perimeter tube 16 which is rectangular with rounded corners and which has a generally square tubular cross section as shown in FIG. 9. The hopper 13 including its rim 16 is formed by known production techniques from plastics having suitable physical characteristics such as polyethylene, polyvinyl chloride, nylon, polycarbonate and polyester. Preferably the hopper is formed by the technique known as rotation molding. Adjacent the front end of the rim 16 it has a pair of transverse grooves 17—17 (FIGS. 8 and 11) which serve as indents to cooperate with a pair of inter-locking detents on the cover 14 as will be hereinafter described. The rim 16 also swells or distends laterally and downwardly adjacent its front end as indicated at 18—18 for guiding cooperation with the lid 14 as will also be described hereinafter. As will be noted from FIG. 9, the front and rear top surfaces of the rim or perimeter tube 16 are appreciably bowed up as indicated at 19 which helps to seal or form a tight fit between the lid 14 and the top of the rim.

Referring to FIGS. 2-7, the lid 14 is preferably formed from a suitable plastic material such as one of the above-mentioned plastics or other plastic having suitable physical properties. It could also be stamped and formed from metal such as aluminum or steel. The lid 14 is generally rectangular with rounded corners at the rear and is symmetrical with respect to its longitudinal center line. For purposes of rigidity, the top of the lid 14 is provided with an embossed formation as indicated at 20 in FIGS. 2 and 12. The U-shaped sidewall 21 of the closure lid 14 flares downwardly and outwardly from the top of the lid and terminates at the bottom in an integral in-turned flange 22. It will be noted that the flange 22 is provided with a plurality of upwardly projecting detents 23—23.

The front end of the lid 14 is open and has an integrally molded inverted U-shaped rigidifying formation 24 (FIGS. 2-4 and 12).

The respective dimensions of the hopper rim 16 and the lid 14 are such that the lid may be readily removed from, and replaced on the hopper 13 by horizontal sliding movements as indicated by the double ended arrow 25 in FIG. 12. The detents 23 on the flange 22 along the sides of the cover 14 progressively engage and press upwardly against the bottom wall 26 (FIGS. 9 and 11) of the rim 16. In the long runs between the side detents 23, the side flanges 22 tend to bow up due to the tight sliding fit between the lid 14 and the rim 16. At the end of the replacement or forward most movement of the cover or lid 14 on the rim 16, guiding engagement occurs between the lid and the rim at the swells or bulges 18 to guide the front end of the lid accurately into place so that the front pair of detents 23 on the lid snap upwardly into locking engagement in the grooves 17—17 in the bottom wall 26 of the rim. At the same time, the three detents 23 spaced along the rear end of the lid 14 (FIGS. 2 and 3) will press upwardly against the bottom wall of the rim 16 and thereby provide a tight and secure fit between the rear of lid 14 and the rear rim 16. In this manner, the resulting retention fit between the cover 14 and rim 10 prevents the cover from becoming dislodged or from sliding rearwardly during travel of the planter either during planting or in travel from place to place. Further, a tight fit is provided along the entire top interface between the lid 14 and rim 16 which acts as a seal against entry of moisture into the hopper and loss of seed or finer particulate materials such as free flowing dry herbicides and insecticides. Such a tight fit is particularly important when a hopper is tilted on its side when on an individual planter 5 that is mounted on a folding wing of a tool bar therefrom.

As mentioned, a planter 5 may be equipped with a hopper for herbicide and/or insecticide as well as a seed hopper. Such an arrangement is shown in FIG. 12 where, in addition to the seed hopper 13, a hopper for herbicide or insecticide is indicated generally at 27. The hopper 27 with respect to its top opening and cover 28 will have a construction corresponding generally to that for the seed hopper 13 with appropriate differences since the hopper 27 will usually be smaller than the hopper 13.

It will be apparent that changes can be made without departing from the invention as disclosed and claimed. For example, the grooves 17 in the bottom of the hopper rim 16 can be replaced with indents or recesses for the detents 23.

What is claimed is:

1. In a multi-row planter comprising for each row a frame having mounted thereon a pair of depth-gauge wheels for supporting the planter during planting, furrow opening means, an elevated seed hopper, seed metering means disposed to receive seeds by gravity from said hopper and meter the seeds into the upper end of a seed tube from the lower end of which the seeds drop into the furrow,
   the improvement which comprises, said hopper having a generally rectangular top opening defined by a generally rectangular rim having vertically spaced top and bottom walls interconnected by a side wall, and,
   a closure lid horizontally slidable onto and off of said top opening and comprising a U-shaped side wall depending from the lid top, said side wall having an integral inturned flange vertically spaced from the lid top a distance whereby in the closed position of said lid on said hopper rim said lid grips said hopper rim, said inturned flange and said hopper rim bottom wall having inter-locking formations which become engaged and provide a retention means for maintaining said lid and rim in said closed position whereby said lid resists dislodgement from said top opening due to agitation of said hopper during planter travel and operation.

2. In the improvement called for in claim 1, the legs of said U-shaped side wall extending substantially the length of the opposite sides of said hopper rim.

3. In the improvement called for in claim 1, at least one of (1) said inturned flange and (2) said hopper rim bottom wall has at least one detent and the other has a corresponding recess or indent which interfit and provide said inter-locking formations.

4. In the improvement called for in claim 3, said inturned flange having said detent and said hopper rim bottom wall having said recess.

5. The improvement called for in claim 4, wherein said inturned flange has a plurality of said detents which are located adjacent the distal end of each leg of said U-shaped side wall.

6. The improvement called for in claim 5, wherein said hopper rim bottom wall has a plurality of said recesses each of which engages a detent on the leading end of said closure lid.

7. The improvement called for in claim 6, wherein said hopper rim has a tubular cross-section which is distended in the vicinity of said recesses so as to provide a close fit between the leading end of said closure lid and said rim in the vicinity of said recesses and thereby guide the leading end of said lid as it reaches its fully closed condition.

8. In the improvement called for in claim 3, said inturned flange on said lid has a plurality of upwardly protruding detents spaced along its length which engage the underside of said hopper rim.

9. The improvement called for in claim 8, wherein two of said recesses and two of said detents inter-lock.

10. The improvement called for in claim 9, wherein the bight portion of said inturned flange has a plurality of upwardly protruding detents which engage the underside of the rear end of said hopper rim.

11. In the improvement called for in claim 1, said seed hopper and said lid being formed of a yieldable plastic material and said top opening rim of said seed hopper being tubular with a generally square or rectangular cross-section.

12. In the improvement called for in claim 1, wherein said hopper is formed from a thermoplastic resin by rotational molding.

13. A hopper and hopper lid combination for containing dry free-flowing particulate material, said hopper having a generally rectangular top opening defined by a generally rectangular rim having vertically spaced top and bottom walls interconnected by a side wall, and, a closure lid horizontally slidable onto and off of said top opening and comprising a U-shaped side wall depending from the lid top, said side position having an integral inturned flange vertically spaced from the lid top a distance whereby in the closed position of said lid on said hopper rim said lid grips said hopper rim, said inturned flange and said hopper rim bottom wall having inter-locking formations which become engaged and provide a retention means for maintaining said lid and rim in said closed position whereby said lid resists dislodgement from said top opening.

14. In the hopper and hopper lid combination called for in claim 13, the legs of said U-shaped side wall extending substantially the length of the opposite sides of said hopper rim.

15. In the hopper and hopper lid combination called for in claim 13, at least one of (1) said inturned flange and (2) said hopper rim bottom wall has at least one detent and the other has a corresponding recess or indent which interfit and provide said inter-locking formations.

16. In the hopper and hopper lid combination called for in claim 15, said inturned flange having said detent and said hopper rim bottom wall having said recess.

17. The hopper and hopper lid combination called for in claim 16, wherein said inturned flange has a plurality of said detents which are located adjacent the distal end of each leg of said U-shaped side wall.

18. The hopper and hopper lid called for in claim 17, wherein said hopper rim bottom wall has a plurality of said recesses each of which engages a detent on the leading end of said closure lid.

19. The hopper and hopper lid combination called for in claim 18, wherein said hopper rim has a tubular cross-section which is distended in the vicinity of said recesses so as to provide a close fit between the leading end of said closure lid and said rim in the vicinity of said recesses and thereby guide the leading end of said lid as it reaches its fully closed condition.

20. In the hopper and hopper lid combination called for in claim 15, said inturned flange on said lid has a plurality of upwardly protruding detents spaced along its length which engage the underside of said hopper rim.

21. The hopper and hopper lid combination called for in claim 20, wherein two of said recesses and two of said detents inter-lock.

22. The hopper and hopper lid combination called for in claim 21, wherein the bight portion of said inturned flange has a plurality of upwardly protruding detents which engage the underside of the rear end of said hopper rim.

23. In the hopper and hopper lid combination called for in claim 13, said seed hopper and said lid being formed of a yieldable plastic material and said top opening rim of said seed hopper being tubular with a generally square or rectangular cross-section.

24. In the hopper and hopper lid combination called for in claim 13, wherein said hopper is formed from a thermoplastic resin by rotational molding.

* * * * *

UNITED STATES PATENT AND TRADEMARK OFFICE
CERTIFICATE OF CORRECTION

PATENT NO. : 5,072,676

DATED : December 17, 1991

INVENTOR(S) : Larry J. Pingry and LaVern Kunk

It is certified that error appears in the above-identified patent and that said Letters Patent is hereby corrected as shown below:

Column 5, line 11 (Claim 13, line 8) delete "position" and insert --wall--.

Signed and Sealed this

Sixth Day of July, 1993

Attest:

MICHAEL K. KIRK

*Attesting Officer*    Acting Commissioner of Patents and Trademarks